United States Patent [19]

Choi

[11] Patent Number: 5,699,600

[45] Date of Patent: Dec. 23, 1997

[54] APPARATUS FOR AUTOMATICALLY PRESS-FITTING A TURNTABLE

[75] Inventor: Young-Suk Choi, Seoul, Rep. of Korea

[73] Assignee: Daewoo Electronics Co., Ltd., Seoul, Rep. of Korea

[21] Appl. No.: 655,779

[22] Filed: May 30, 1996

[30] Foreign Application Priority Data

May 31, 1995 [KR] Rep. of Korea ............. 95-14134
May 31, 1995 [KR] Rep. of Korea ............. 95-14136

[51] Int. Cl.$^6$ ............................................ B23P 19/02
[52] U.S. Cl. ........................................... 29/251; 29/252
[58] Field of Search ................. 29/251, 252, 281.3; 100/49, 296.06

[56] References Cited

U.S. PATENT DOCUMENTS

| 3,052,955 | 9/1962 | McAndrews et al. | 29/281.3 |
| 3,651,555 | 3/1972 | Kataoka | 29/251 |
| 3,802,336 | 4/1974 | Toppins | 100/49 |
| 5,495,660 | 3/1996 | Choi | 29/251 |

FOREIGN PATENT DOCUMENTS

| 271677 | 10/1989 | Japan | 29/261.3 |
| 406011725 | 1/1994 | Japan | 29/251 |
| 1481019 | 5/1989 | U.S.S.R. | 29/252 |

Primary Examiner—Robert C. Watson
Assistant Examiner—Thomas W. Lynch
Attorney, Agent, or Firm—Lowe, Price, LeBlanc & Becker

[57] ABSTRACT

An apparatus for automatically press-fitting a turntable has a turntable driving motor which is attachably/detachably installed to/from a driving motor fixing part for inserting a rotating shaft of the driving motor into a turntable assembly with significantly high precision to minimize eccentric error. Here, a first press-fitting part pressively fixes the driving motor to the driving motor fixing part, and a second press-fitting part descends the driving motor fixing part press-fitted with the driving motor in a motor shaft direction. The center of a turntable assembly fixing part is arranged at an extending line of driving motor shaft to allow a rotating shaft of the turntable assembly to be exactly coaxial with the driving motor.

16 Claims, 6 Drawing Sheets

APPARATUS FOR AUTOMATICALLY PRESS-FITTING A TURNTABLE

BACKGROUND OF THE INVENTION

1. Field of the Invention

The present invention relates to an apparatus for automatically press-fitting a turntable, and more particularly to an apparatus for automatically press-fitting a turntable capable of minimizing an eccentric error by inserting a rotating shaft of a driving motor to a turntable assembly with significantly high precision.

2. Description of the Prior Art

Generally, an appliance such as optical video disc players, digital audio disc players and compact disc players is an apparatus for performing recording or reproducing operation with respect to a disc capable of magnetic recording or optical recording. In these appliances, the disc containing various audio signals or video signals is mounted to a turntable assembly of a corresponding disc player, and then the information is reproduced while rotating the disc by using the turntable assembly. U.S. Pat. Nos. 5,228,023 and 4,771,971 disclose examples of a construction and manufacturing method of the conventional turntable assembly.

The conventional turntable assembly will be described with reference to FIGS. 1 and 2 below.

Figure 1:
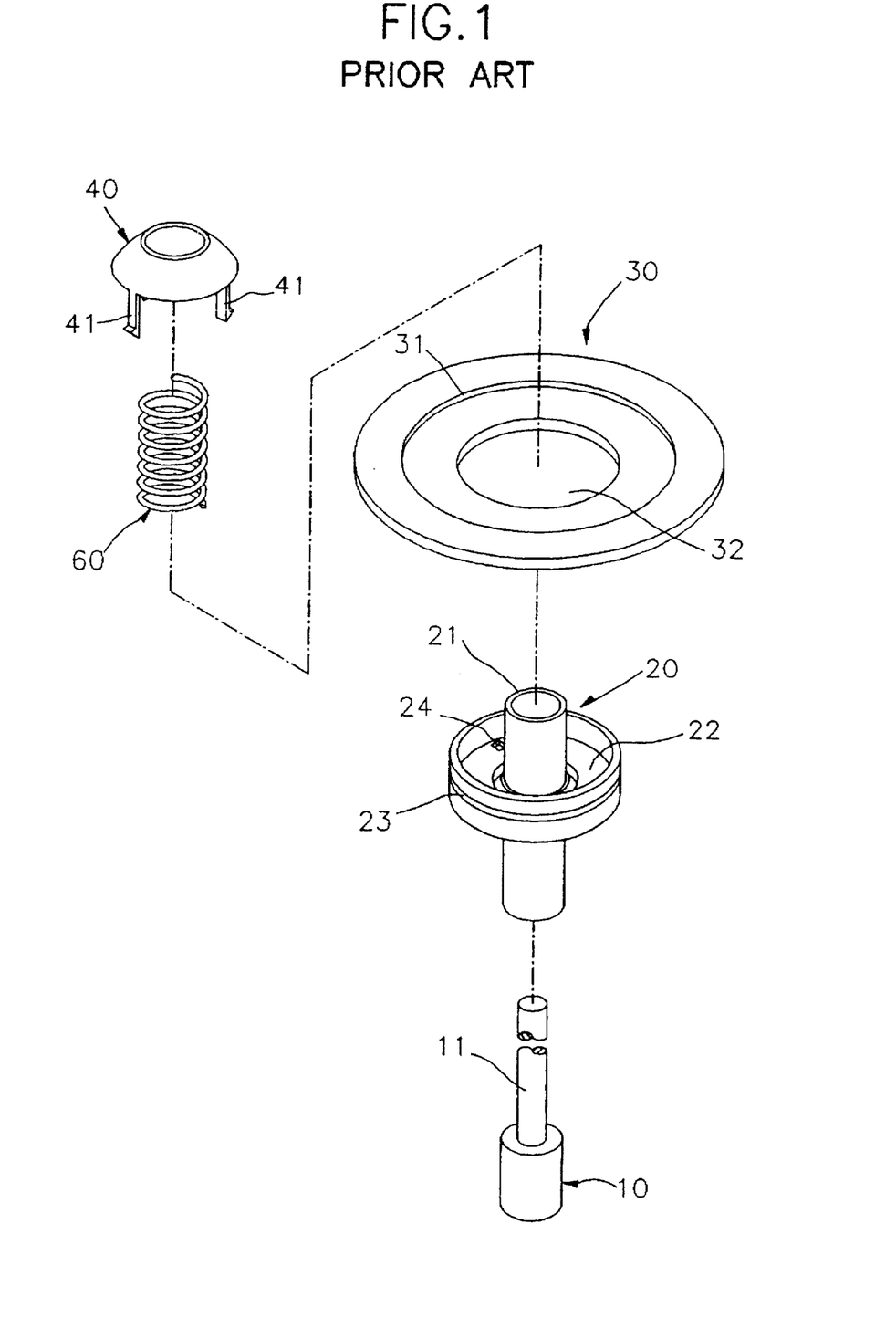
FIG. 1 is an exploded perspective view showing a conventional turntable assembly.
Figure 2:
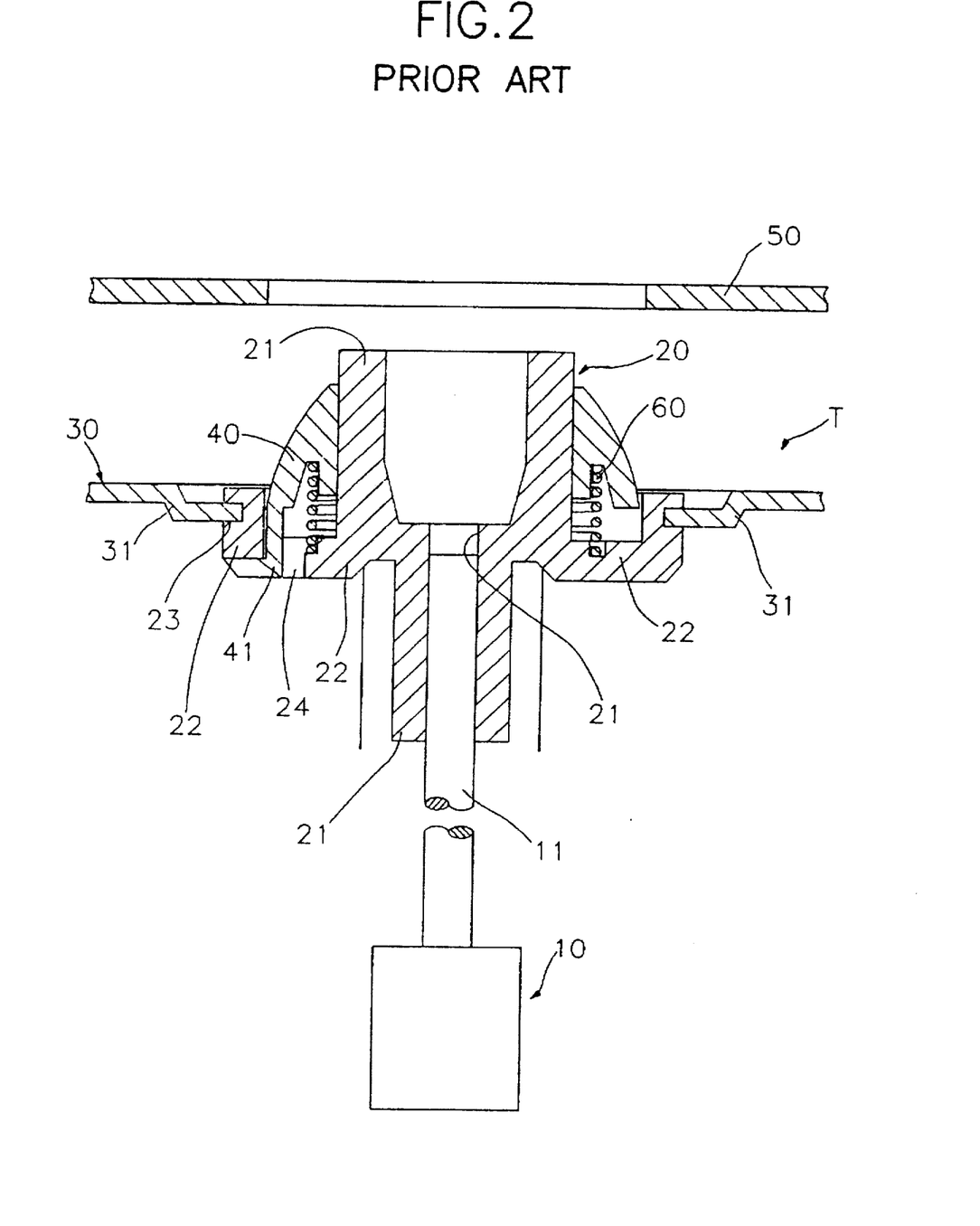
FIG. 2 is a sectional view showing a state of press-fitting the conventional turntable assembly into the driving motor.

FIG. 1 is an exploded perspective view showing the conventional turntable assembly, and FIG. 2 is a sectional view showing a joining state that the conventional turntable assembly is press-fitted into a driving motor.

Here, a reference numeral 10 denotes a spindle motor as a driving motor which is formed with a motor shaft 11 at an upper portion thereof. A supporting shaft member 20 is integrally formed with a cylindrical core portion 21 fitted with spindle motor shaft 11 and a supporting portion 22 for supporting a disc stand member 30. A plurality of insertion holes 24 are formed in the bottom plane of supporting portion 22 which has a circular groove 23 along the outer circumference thereof. Disc stand member 30 is shaped as a disc having an opening 32 in the center for receiving supporting shaft member 20 therethrough. The inner periphery of disc stand member 30 is engaged into outer circular groove 23 in supporting portion 22 of supporting shaft member 20. Disc stand member 30 is formed with a bending portion 31 which is upwardly bent for seating a disc thereon. A spring 60 is fitted to an upper portion of cylindrical core portion 21 of supporting shaft member 20. A pressing member 40 is put on cylindrical core portion 21 of supporting shaft member 20 coupled with spring 60. Pressing member 40 is formed with hook-like projections 41 directing downward to be respectively inserted to insertion holes 24 of supporting shaft member 20.

Then, as shown in FIG. 2, turntable assembly T is installed under the state of being inserted with motor driving shaft 11. While disc 50 is mounted to the upper portion of turntable assembly T, information within disc 50 can be reproduced by actuating the rotation of spindle motor 10.

As described above, turntable assembly T undergoes the assembling process under the state that spindle motor shaft 11 is forcibly press-fitted into cylindrical core portion 21 of supporting shaft member 20. A conventional apparatus for press-fitting the turntable employed for this process consists of a jig for holding the outer periphery of driving motor 10 at the lower side thereof and a magnetic chuck for electrically holding supporting shaft member 20 of turntable assembly T at the upper side thereof.

Under this state, the jig is moved upward and the magnetic chuck is moved downward to pressively fitting rotating shaft 11 of driving motor 10 fixed to the jig into the turntable fixed to the magnetic chuck, thereby assembling the elements.

In the above-mentioned conventional press-fitting process, however, when driving motor shaft 11 is press-fitted into cylindrical core portion 21 of supporting shaft member 20 of turntable assembly T, the outer periphery of driving motor 10 is held by means of the jig to be highly probable that an error is induced at rotating shaft 11 of driving motor 10 which is the center portion. Furthermore, when driving motor 11 is press-fitted into cylindrical core portion 21 of supporting shaft member 20 of turntable assembly T, the outer periphery of turntable assembly T is held by means of the magnetic chuck at the upper portion to be highly probable to produce an eccentric error at cylindrical core 21 which is the center portion thereof. For these reasons, turntable assembly T is not to be precisely joined with driving motor shaft 11 to be liable to shake cylindrical core portion 21 of turntable assembly T with the consequence of degrading playback accuracy when the disc is being reproduced.

SUMMARY OF THE INVENTION

It is an object of the present invention to provide an apparatus for automatically press-fitting a turntable capable of minimizing an eccentric error by inserting a rotating shaft of a driving motor to a turntable assembly with significantly high precision.

To achieve the above object of the present invention, an apparatus for automatically press-fitting a turntable includes a driving motor fixing part for installing a driving motor to be attachable/detachable state. Also, a first press-fitting part pressively-fixes the driving motor into the driving motor fixing part, and a second press-fitting part moves the driving motor fixing part press-fitted with the driving motor in the direction of a motor shaft. Then, a turntable assembly fixing part for attachably/detachably installing a turntable assembly has a center arranged at an extending line of the driving motor shaft, so that a rotating shaft of the turntable assembly is to be accurately coaxial with the driving motor when the turntable assembly is installed thereto.

The apparatus for automatically press-fitting the turntable further has guide members installed to be parallel with the motor shaft direction for precisely guiding the second press-fitting part in the motor shaft direction. Thus, the second press-fitting part precisely moves the driving motor fixing part in the motor shaft direction.

Preferably, the turntable fixing member is installed with a limit switch onto a predetermined position of an upper portion thereof for controlling the movement of the driving motor fixing part when the driving motor fixing part moves to direct toward the turntable assembly.

It is preferably that the turntable fixing member includes an annular projection on an upper portion thereof for being inserted with a supporting shaft member of the turntable assembly, a guiding slot penetrating up and down along the central axis thereof, and a space in a lower portion of the guiding slot having a diameter greater than that of the guiding slot.

Furthermore, a guide pin is installed into the guiding slot of the turntable fixing member and the space in the lower portion of the guiding slot to be movable up and down. Here, a central axis of the guide pin is to be exactly coaxial with the motor shaft of the driving motor.

At this time, the guide pin has a section as a reversed-T shape, in which a head portion of the T-shaped pin is arranged to the space in the lower portion of the guiding slot, and a diameter of the head portion of the T-shaped pin is formed to be greater than the diameter of the guiding slot for preventing deviation thereof from the guiding slot.

Preferably, the guide pin is formed to have a lower end installed to be in contact with an elastic spring, and an upper end thereof penetrates through the guiding slot of the turntable fixing member to protrude from the annular projection.

The driving motor fixing part has a slide opened for receiving the driving motor therethrough, and an elongated guide hole is formed in a bottom plane thereof for permitting the driving motor shaft to pass through the bottom plane. Also, an abutment that is provided at an upper portion of the elongated guide hole in the bottom plane, so that the driving motor fixing part precisely holds the motor shaft of the driving motor.

Additionally, the driving motor fixing part is installed with a photosensitive switch at a predetermined position of an internal space to be disposed with the driving motor. Thus, the mounting of the driving motor into the driving motor fixing part is sensed to drive the first press-fitting part.

The apparatus for automatically press-fitting a turntable, for the purpose of more precisely mounting the driving motor into the driving motor fixing part, includes a photosensitive sensor for sensing an inclined range of the driving motor mounted to the driving motor fixing part, and an A/D converter for converting an analog signal with respect to the inclination sensed in the photosensitive sensor into a digital signal. The inclination displayed as the digital signal supplied from the A/D converter is compared with a preset allowable inclination value in a microprocessor, and a digital display board externally displays the numerical value determined in the microprocessor.

In view of the apparatus for automatically press-fitting the turntable, when the driving motor shaft is press-fitted into the cylindrical core portion of the supporting shaft member of the turntable assembly, the rotating shaft portion of the turntable assembly and the shaft portion of the driving shaft are respectively held to be joined altogether. Therefore, the joining of the turntable assembly and driving motor shaft is carried out with significantly high precision to enhance playback accuracy during the reproduction of the disc.

BRIEF DESCRIPTION OF THE DRAWINGS

The above objects and other advantages of the present invention will become more apparent by describing in detail preferred embodiments thereof with reference to the attached drawings in which.

DETAILED DESCRIPTION OF THE PREFERRED EMBODIMENT

Hereinbelow, an apparatus for automatically press-fitting a turntable according to the present invention will be described in detail with reference to the accompanying drawings.

Figure 3:
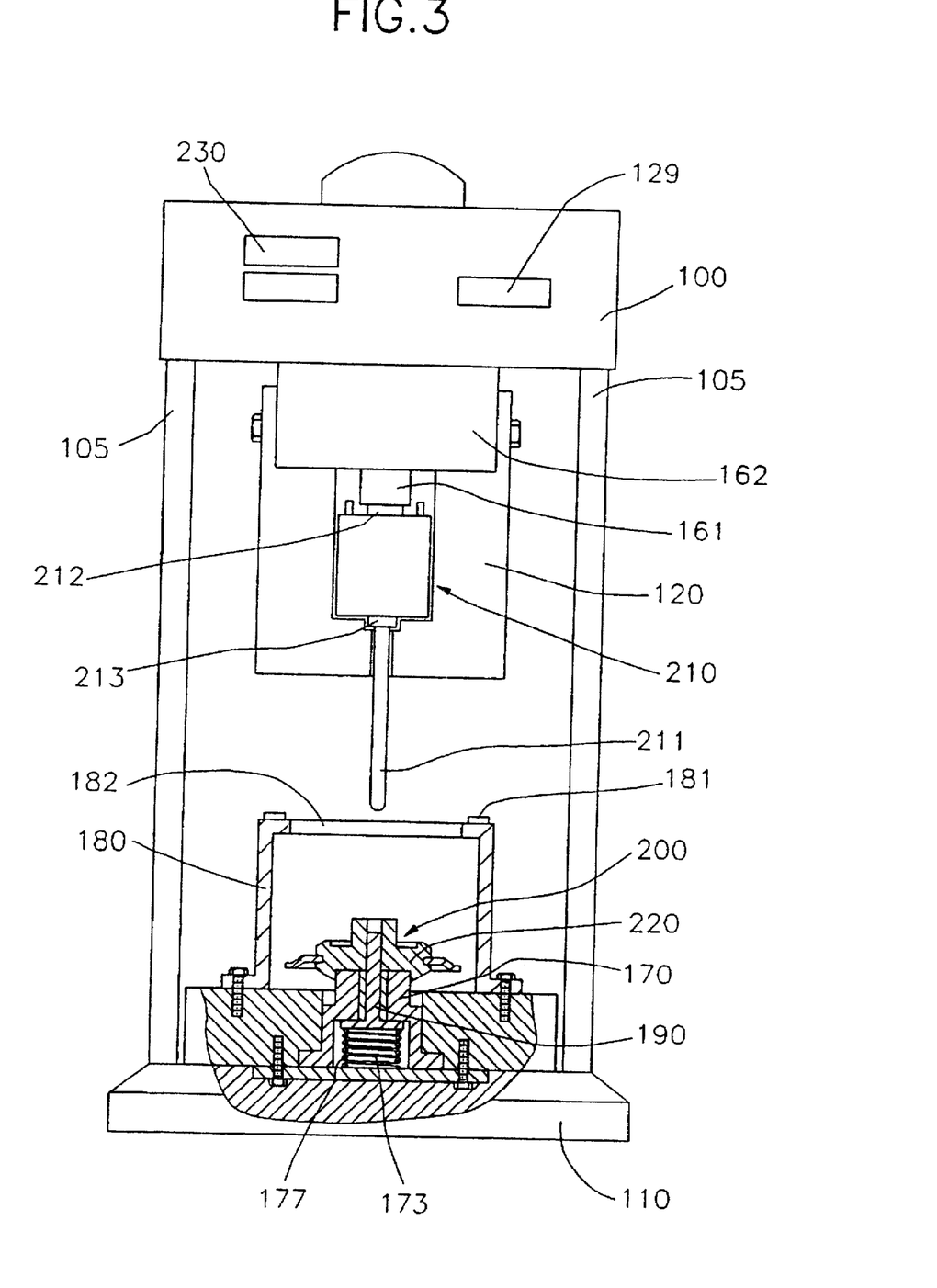
FIG. 3 is a diagrammatic section view showing an apparatus for automatically press-fitting a turntable according to the present invention.
Figure 4:
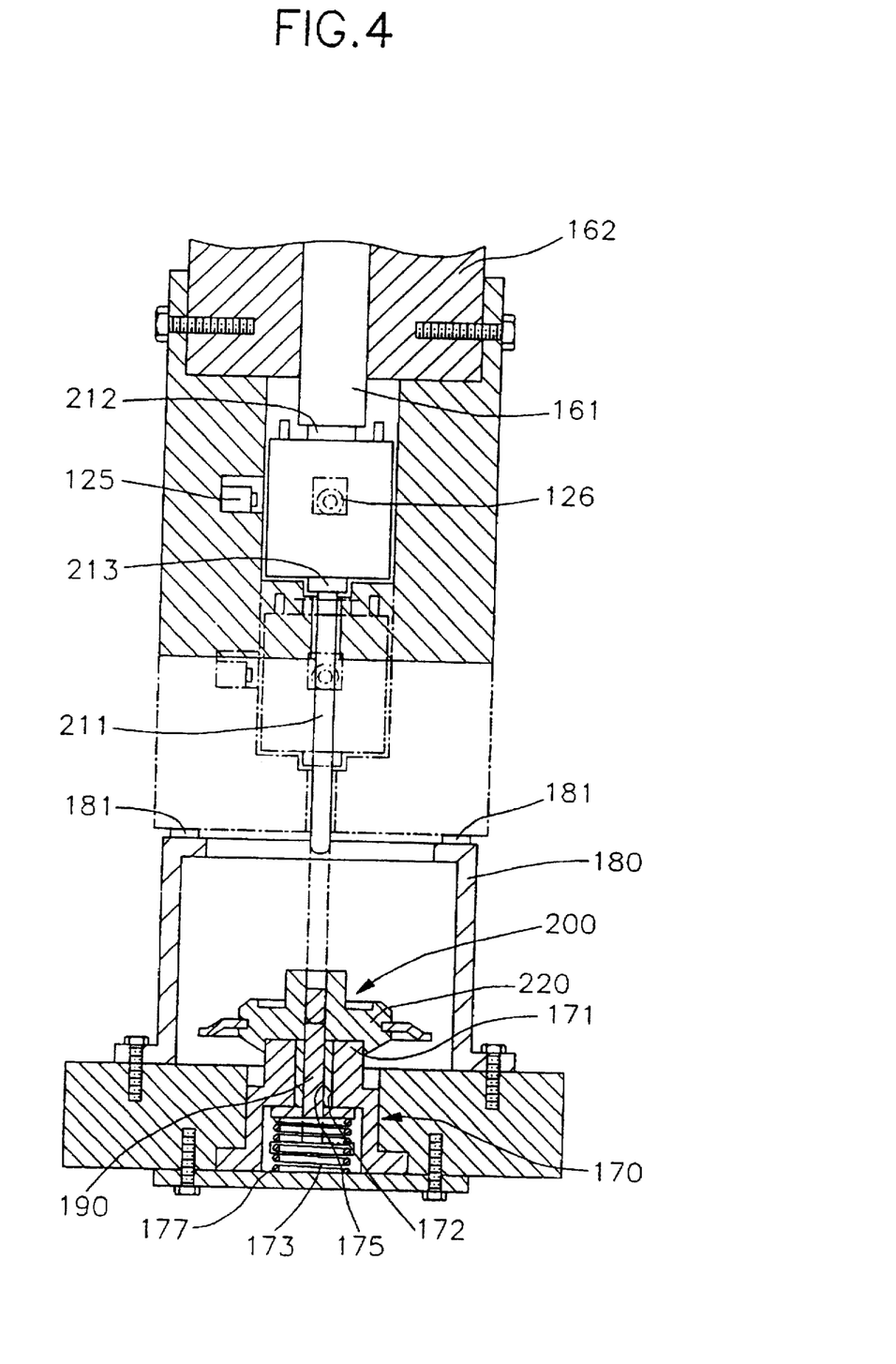
FIG. 4 is an elongated section view showing a state of joining the turntable assembly with the motor shaft of the apparatus for automatically press-fitting the turntable shown in FIG. 3.
Figure 5:
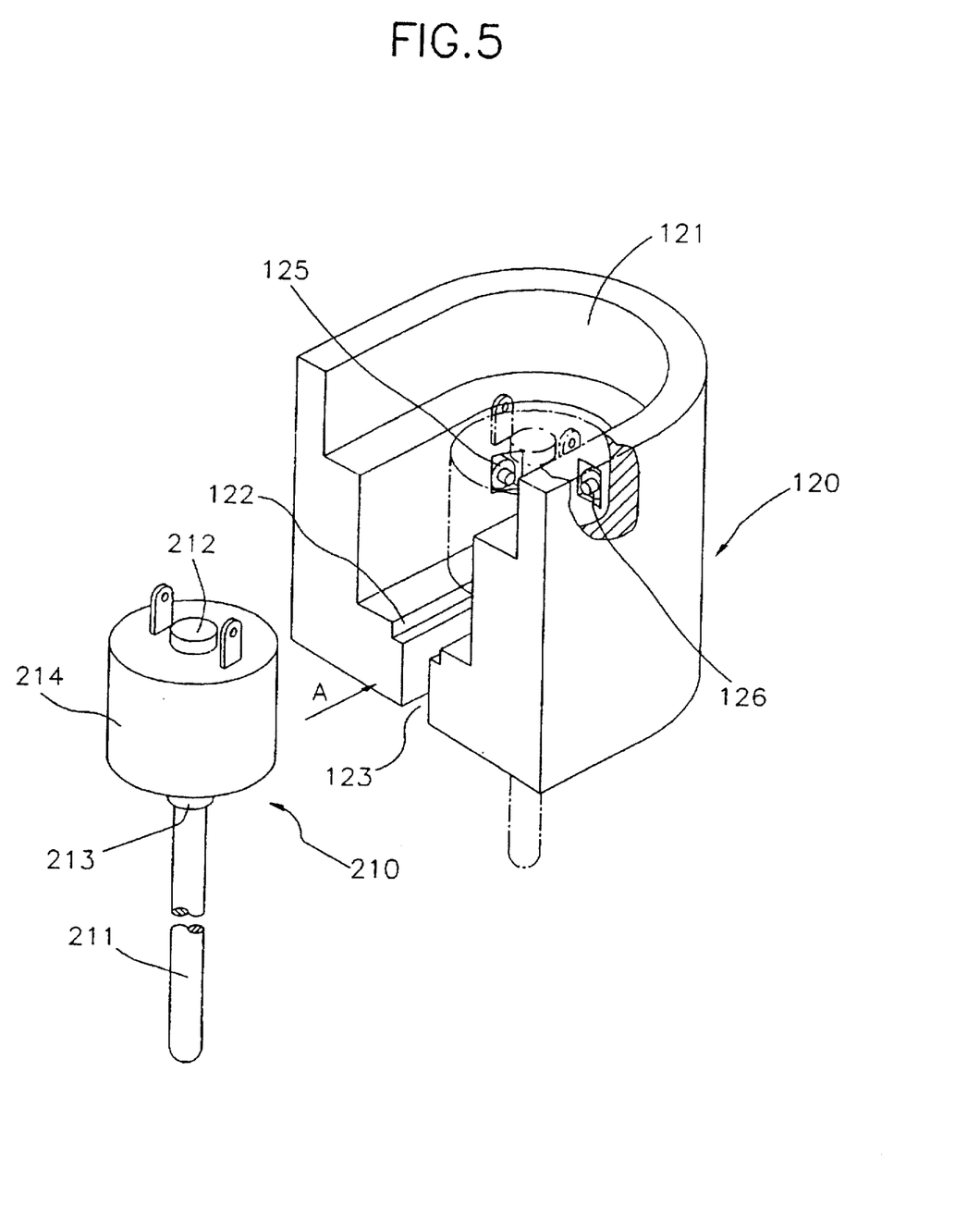
FIG. 5 is a partial enlargement view showing a state of inserting the driving motor to the motor fixing part of the apparatus for automatically press-fitting the turntable shown in FIG. 3.
Figure 6:
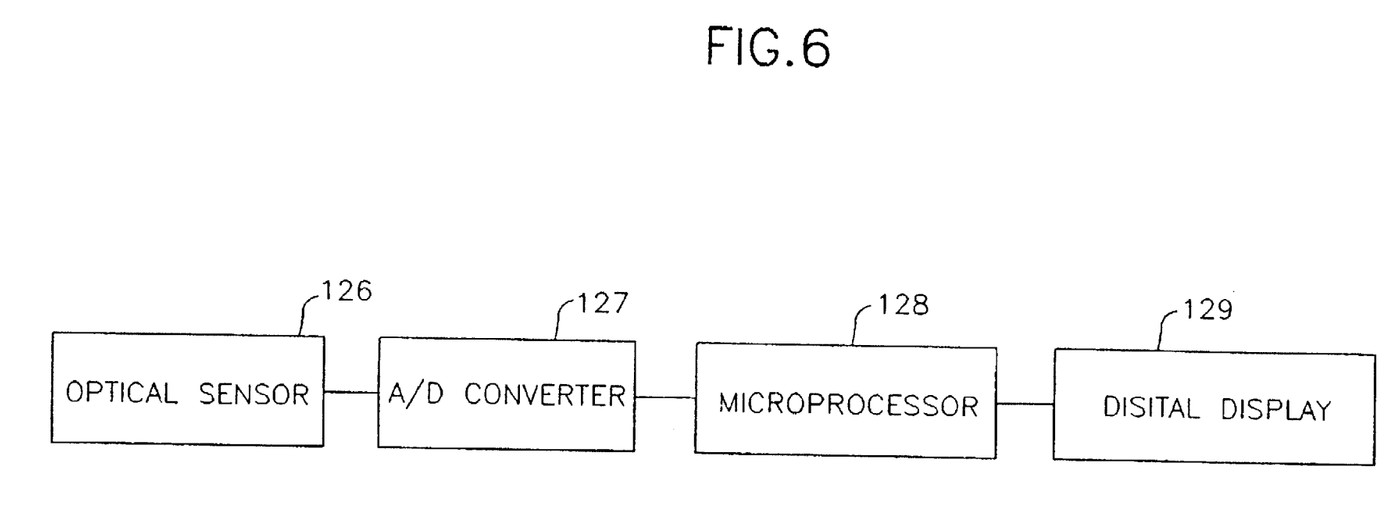
FIG. 6 is a block diagram showing respective parts designated as blocks for more accurately mounting the motor driving parts in the apparatus for automatically press-fitting the turntable shown in FIG. 3.

FIG. 3 is a diagrammatic section view showing the apparatus for automatically press-fitting the turntable according to the present invention, and FIG. 4 is an enlarged section view showing a state of joining the turntable assembly with the motor shaft of the apparatus for automatically press-fitting the turntable shown in FIG. 3. FIG. 5 is a partial enlargement view showing a state of inserting the driving motor to the motor fixing part of the apparatus for automatically press-fitting the turntable shown in FIG. 3. FIG. 6 is a block diagram showing parts designated as blocks for more precisely mounting the motor driving part in the apparatus for automatically press-fitting the turntable shown in FIG. 3.

As illustrated in FIGS. 3 to 6, a reference numeral 120 denotes a driving motor fixing part for installing a driving motor 210 to be attachable/detachable to/from the interior thereof. Motor fixing part 120 has one side opened for receiving driving motor 210 therethrough. An elongated guide hole 123 is formed in the bottom plane of motor fixing part 120 for allowing motor shaft 211 to pass through the bottom plane. An abutment 122 is formed for fixedly holding driving motor shaft 211 of driving motor 210 at the upper portion of elongated guide hole 123 in the bottom plane of motor fixing part 120.

Motor fixing part 120 includes a photosensitive switch 125 installed to a predetermined portion of an internal space into which driving motor 210 is to be disposed later.

Motor fixing part 120 further has a photosensitive sensor 126 which senses an inclined range of driving motor 40 mounted thereto. For converting an analog signal with respect to the inclination sensed via photosensitive sensor 126 into a digital signal, an A/D converter 127 is installed. Also, a microprocessor 128 is installed to compare a value of the inclination displayed by the digital signal supplied from A/D converter 127 with a preset allowable inclination value. A digital display board 129 for displaying the numerical value determined in microprocessor 128 is installed within a first supporting part 100.

A first hydraulic cylinder 161 and a second hydraulic cylinder 162 are installed to an upper portion of driving motor fixing part 120. Photosensitive switch 125 senses the mounting of driving motor 210 to motor fixing part 120 to drive first hydraulic cylinder 161 which, in turn, downwardly presses inserted driving motor 210 to fix it to motor fixing part 120. Second hydraulic cylinder 162 is provided for moving motor fixing part 120 pressively fixed with driving motor 210 in the direction of motor shaft 211.

First and second hydraulic cylinders 161 and 162 are installed onto first supporting part 100. In addition, a variety of controlling apparatuses are installed within first supporting part 100. For example, a reference numeral 230 denotes a start button for forcing photosensitive switch 125 and the like to be operation-on state when being pressed after driving motor 210 is inserted within motor fixing part 120.

Guide rods 105 and 105 are installed to be parallel with the direction of motor shaft 211 so as to move first and second hydraulic cylinders 161 and 162 in the direction of motor shaft 211 of driving motor 210 installed within motor fixing part 120.

A second supporting stand 110 is installed to the other ends extending from guide rods 105 and 105. A turntable fixing member 170 is installed onto second supporting stand 110 at the place opposite to motor fixing part 120.

Turntable fixing member 170 is for attachably/detachably installing a turntable assembly 200, which accurately arranges the central axis thereof to the extending line of driving motor shaft 211. By doing so, when turntable assembly 200 is installed, a rotating shaft of turntable assembly 200 is to be exactly coaxial with motor shaft 211 of driving motor 210. Turntable fixing member 170 has an annular projection 171 capable of being inserted with supporting shaft member 220 of turntable assembly 200 at the upper portion thereof. Turntable fixing member 170 is formed with a guiding slot 172 piercing up and down along the central axis, and a space 173 having a diameter larger than that of guiding slot 172 is formed to a lower portion of guiding slot 172.

A guide pin 190 movable up and down has a section of reversed-T shape, which is installed into guiding slot 172 of turntable fixing member 170 and space 173 provided to the lower portion thereof. The central axis of guide pin 190 is to be accurately coaxial with motor shaft 211 of driving motor 210. The head portion of the T-shaped guide pin 190 is disposed to space 173 at the lower portion of guiding slot 172, in which the diameter of the head portion of the T-shaped pin is formed to be greater than that of guiding slot 172 for preventing the deviation from guiding slot 172.

An elastic spring 177 is installed to a lower portion of guide pin 190 to be in contact with the head portion of the T-shaped pin. Once guide pin 190 is pressed downward, spring 177 is constricted. Also, when guide plate 190 is pushed upward by the elasticity, the tail portion of the T-shaped pin penetrates through guiding slot 172 to protrude from annular projection 171.

By this construction, guide pin 190 is exactly installed to the central axis of turntable fixing member 170 is inserted to supporting shaft member 220 of turntable assembly 210. Consequently, the balance of turntable assembly 210 can be kept with rarely involving an error.

A guide bearing 175 is installed to a sidewall of guiding slot 172 of turntable fixing member 170 for smoothing the up and down movement of guide pin 190.

A reference numeral 180 denotes a protection member which wraps turntable fixing member 170 mounted with turntable assembly 200. An upper portion of protection member 180 is formed with an opening 182 for providing a path of motor shaft 211. The upper plane of protection member 180 may obstruct the movement of motor fixing part 120 when motor fixing part 120 moves toward turntable assembly 200. A limit switch 181 is installed to the upper plane of protection member 180 to turn off the operation of second hydraulic cylinder 162 which moves motor fixing part 120 downward.

Now, an operation the apparatus automatically press-fitting the turntable will be described.

In order to insert motor shaft 211 of driving motor 210 within supporting shaft member 220 of turntable assembly 200, supporting shaft member 220 of turntable assembly 200 is fitted into annular projection 171 of turntable fixing member 170. At this time, the end of guide pin 190 protruding from annular projection 17 after piercing through guiding slot 172 is inserted to rotating shaft of turntable assembly 200, thereby accurately keeping the balance of turntable assembly 200.

Meantime, motor fixing part 120 is inserted with driving motor 210 via the side opened. After motor shaft 211 of driving motor 210 passes through an elongated guide hole 123 formed in the bottom plane of motor fixing part 120, driving motor 210 is installed to be attachable/detachable to/from the interior of motor fixing part 120. By accurately inserting driving shaft 211 of driving motor 210 to abutment 122 formed to the upper portion of elongated guide hole 123 in the bottom plane of motor fixing part 120, driving shaft 211 can be more exactly held.

When driving motor 210 is mounted within motor fixing part 120, photosensitive sensor 126 senses the inclined range of mounted driving motor 210. The analog signal with respect to the inclination sensed via photosensitive sensor 126 is digitized in A/D converter 127. Microprocessor 128 compares the inclination value displayed as the digital signal supplied from A/D converter 127 with the preset allowable inclination value. The numerical value determined in microprocessor 128 is externally displayed via digital display board 129 installed within first supporting part 100.

At this time, if the displayed value is smaller than the preset allowable inclination value, the succeeding process is performed. Whereas, if it exceeds the allowable value, the center of driving motor 210 is adjusted to force the inclination to be below the allowable value.

As described above, once start button 230 is pressed after inserting driving motor 210 within motor fixing part 120, photosensitive switch 125 is to be in the operation-on state.

Photosensitive switch 125 senses the mounting of driving motor 210 into motor fixing part 120 in the manner of sensing the quantity of reflected light radiated upon driving motor 210 and, at this time, descends first hydraulic cylinder 161. Successively, first hydraulic cylinder 161 downwardly presses a projection 212 at the upper portion of inserted driving motor 210 to make a shaft fitting part 213 of driving motor 210 be accurately held to abutment 123 of motor fixing part 120.

Under the state that driving motor 210 is pressively fixed to motor fixing part 120 as described above, second hydraulic cylinder 162 continuously moves motor fixing part 120 downward along guide rods 105 and 105 installed to be parallel with the direction of motor shaft 211.

By this operation, while motor fixing part 120 moves toward turntable assembly 200, motor shaft 211 passes through opening 182 formed in the upper portion of protection member 180 which wraps turntable fixing member 170 mounted with turntable assembly 200.

Since the rotating shaft of turntable assembly 200 is accurately coaxial with motor shaft 211 of driving motor 210, motor shaft 211 is inserted to exactly correspond to supporting shaft member 200 of turntable assembly 200.

Then, motor shaft 211 presses guide pin 190 having the section of reversed-T shape and movable up and down within guiding slot 172 of turntable fixing member 170 and space 173 provided to the lower portion of guiding slot 172. Here, the central axis of guide pin 190 is accurately coaxial with motor shaft 211 of driving member 210.

Therefore, while guide pin 190 is continuously pressed downward and spring 177 at the lower portion thereof is constricted, the rotating shaft being motor shaft 211 of driving motor 210 is completely inserted within supporting shaft member 220 of turntable assembly 200.

The portion designated by a dotted line shown in FIG. 4 illustrates the state, as described above, that driving motor 210 is moved downward to permit rotating shaft 211 to fully insert to supporting shaft member 220 of turntable assembly 200.

At this time, the bottom plane of motor fixing part 120 presses limit switch 181 installed to the upper portion of protection member 180. By this pressing, second hydraulic cylinder 162 is once stopped to thereby return to its original position. Thus, the downward movement of motor fixing part 120 is stopped, too.

Then, motor fixing part 120 returns to its original position together with driving motor 210 of which driving motor shaft 211 is press-fitted into turntable assembly 200. Thereafter, first hydraulic cylinder 161 ascends to its original position.

By doing so, the pressive fitting of driving motor 210 with respect to turntable assembly 200 is completed.

Driving motor 210 including turntable assembly 200 press-fitted with motor shaft 211 is drawn out from motor fixing part 120 to employ it as one constituting element during manufacturing an optical disc player.

Here, a guide bearing 175 for smoothing the up and down movement of guide pin 190 may be selected from bearings of various kinds such as a typically-utilized lubricating bearing or ball bearing, provided that it has the smallest center error as possible.

In the apparatus for press-fitting the turntable constructed as above, when the driving motor shaft is press-fitted into the cylindrical core portion of the supporting shaft member of the turntable assembly, the rotating shaft portion of the turntable assembly and the shaft portion of the driving shaft are respectively held to be joined with each other. As the result, the joining of the turntable assembly and driving motor shaft is carried out with the significantly high precision to raise playback accuracy during the reproduction of the disc.

While the present invention has been particularly shown and described with reference to particular embodiment thereof, it will be understood by those skilled in the art that various changes in form and details may be effected therein without departing from the spirit and scope of the invention as defined by the appended claims.

What is claimed is:

1. An apparatus for automatically press-fitting a turntable comprising:

a driving motor fixing part for being installed with an attachable driving motor;

a first press-fitting part for pressively-fixing said driving motor into said driving motor fixing part;

a second press-fitting part for moving said driving motor fixing part press-fitted with said driving motor in the direction of a motor shaft; and a turntable assembly fixing part for being installed with an attachable turntable assembly, the turntable assembly fixing part having a central axis arranged at an extending line of a shaft of the driving motor to permit a rotating shaft of said turntable assembly to be exactly coaxial with said driving motor when said turntable assembly is installed at the turntable assembly fixing part, said turntable assembly fixing part having an annular projection formed coaxially with and on an upper portion of the turntable assembly fixing part, said annular projection being inserted into a groove of round shape formed on a supporting shaft member of said turntable assembly, a guiding slot for being penetrated up and down along the central axis of the turntable assembly fixing part, a space formed under the guiding slot having a diameter greater than that of the guiding slot, and a guide pin installed in the guiding slot and the space of the turntable assembly fixing part, the guide pin being formed to have a lower end installed to be in contact with an elastic spring and an upper end penetrating through the guiding slot and protruding over the annular projection, and the guiding slot for allowing a central axis of the guide pin to be exactly coaxial with the motor shaft of the driving motor.

2. The apparatus for automatically press-fitting a turntable as claimed in claim 1, further comprising guide members installed to be parallel with a direction of the motor shaft for precisely guiding said second press-fitting part in the direction of the motor shaft, whereby said second press-fitting part precisely moves said driving motor fixing part in the direction of the motor shaft.

3. The apparatus for automatically press-fitting a turntable as claimed in claim 1, wherein said turntable assembly fixing part is installed with a limit switch on a predetermined position of an upper portion thereof for controlling the movement of said driving motor fixing part when said driving motor fixing part is moved toward said turntable assembly.

4. The apparatus for automatically press-fitting a turntable as claimed in claim 1, wherein said guide pin has a section as an inverted-T shape having a head portion arranged to said space in the lower portion of said guiding slot, and a diameter of said head portion is formed to be greater than said diameter of said guiding slot for preventing deviation thereof from said guiding slot.

5. The apparatus for automatically press-fitting a turntable as claimed in claim 1, wherein said driving motor fixing part has a side opened for receiving said driving motor therethrough, an elongated guide hole in a bottom plane thereof for permitting said driving motor shaft to pass through said bottom plane, and an abutment at an upper portion of said elongated guide hole in said bottom plane for permitting said driving motor fixing part to precisely hold said motor shaft of said driving motor.

6. An apparatus for automatically press-fitting a turntable comprising:

a driving motor fixing part for being installed with an attachable driving motor, said driving motor fixing part being installed with a photosensitive switch at a predetermined position of an internal space in which the driving motor is to be disposed for sensing the mounting of said driving motor into said driving motor fixing part to thereby drive a first a first press-fitting part for pressively-fixing said driving motor into said driving motor fixing part, a second press-fitting part for moving said driving motor fixing part press-fitted with said driving motor in the direction of a motor shaft; and a turntable assembly fixing part for being installed with an attachable turntable assembly, the turntable assembly fixing part having a central axis arranged at an extending line of a shaft of the driving motor to permit a rotating shaft of the turntable assembly to be exactly coaxial with the driving motor when the turntable assembly is installed at the turntable assembly fixing part.

7. The apparatus for automatically press-fitting a turntable as claimed in claim 6, further comparing guide members installed to be parallel with a direction of motor shaft for precisely guiding said second press-fitting part in the direction of the motor shaft.

8. The apparatus for automatically press-fitting a turntable as claimed in claim 6, wherein said turntable assembly fixing part is installed with a limit switch on a predetermined position of an upper portion thereof for controlling the movement of said driving motor fixing part when said driving motor fixing part is moved toward the turntable assembly.

9. The apparatus for automatically press-fitting a turntable as claimed in claim 6, wherein the turntable assembly fixing part has an annular projection formed coaxially with and on an upper portion of the turntable assembly fixing part, said annular projection being inserted into a groove of round shape formed on a supporting shaft member of said turntable assembly, a guiding slot for being penetrated up and down along the central axis of the turntable assembly fixing part, a space formed under the guiding slot having a diameter greater than that of the guiding slot, and a guide pin installed in the guiding slot and the space of the turntable assembly fixing part, the guide pin being formed to have a lower end installed to be in contact with an elastic spring and an upper end penetrating through the guiding slot and protruding over the annular projection, and the guiding slot for allowing a central axis of the guide pin to be exactly coaxial with the motor shaft of the driving motor.

10. The apparatus for automatically press-fitting turntable as claimed in claim 9, wherein the guide pin has a section as an inverted-T shape having a head portion arranged to said space in the lower portion of the guiding slot, and a diameter of the head portion is formed to be greater than the diameter of the guiding slot for preventing deviation thereof from the guiding slot.

11. The apparatus for automatically press-fitting a turntable as claimed in claim 6, wherein said driving motor fixing part has a side opened for receiving the driving motor therethrough, an elongated guide hole in a bottom plane thereof for permitting the shaft of driving motor to pass through the bottom plane, and an abutment at an upper portion of the elongated guide hole in the bottom plane for permitting said driving motor fixing part to precisely hold the shaft of driving motor.

12. An apparatus for automatically press-fitting a turntable comprising:

a driving motor fixing part for being installed with an attachable driving motor;

a first press-fitting part for pressively-fixing said driving motor into said driving motor fixing part;

a second press-fitting part for moving said driving motor fixing part press-fitted with said driving motor in the direction of a motor shaft;

a turntable assembly fixing part for being installed with an attachable turntable assembly, the turntable assembly fixing part having a central axis arranged at an extending line of a shaft of the driving motor to permit a rotating shaft of the turntable assembly to be exactly coaxial with the driving motor when the turntable assembly is installed at the turntable assembly fixing part; and a photosensitive sensor for sensing an inclined range of said driving motor mounted to said driving motor fixing part, an A/D converter for converting an analog signal with respect to the inclination sensed in said photosensitive sensor into a digital signal, a microprocessor for comparing the inclination value displayed as said digital signal supplied from said A/D converter with a preset allowable inclination value, and a digital display board for externally displaying the numerical value determined in said microprocessor, so that said driving motor is more precisely mounted into said driving motor fixing part.

13. The apparatus for automatically press-fitting a turntable as claimed in claim 12, further comprising guide members installed to be parallel with a direction of motor shaft for precisely guiding said second press-fitting part in the direction of the motor shaft, whereby said second press-fitting part precisely moves the driving motor fixing part in the direction of the motor shaft.

14. The apparatus for automatically press-fitting a turntable as claimed in claim 12, wherein said turntable assembly fixing part is installed with a limit switch on a predetermined position of an upper portion thereof for controlling the movement of said driving motor fixing part when said driving motor fixing part is moved toward the turntable assembly.

15. The apparatus for automatically press-fitting a turntable as claimed in claim 12, wherein the turntable assembly fixing part has an annular projection formed coaxially with and on an upper portion of the turntable assembly fixing part, said annular projection being inserted into a groove of round shape formed on a supporting shaft member of said turntable assembly, a guiding slot for being penetrated up and down along the central axis of the turntable assembly fixing part, a space formed under the guiding slot having a diameter greater than that of the guiding slot, and a guide pin installed in the guiding slot and the space of the turntable assembly fixing part, the guide pin being formed to have a lower end installed to be in contact with an elastic spring and an upper end penetrating through the guiding slot and protruding over the annular projection, and the guiding slot for allowing a central axis of the guide pin to be exactly coaxial with the motor shaft of the driving motor.

16. The apparatus for automatically press-fitting a turntable as claimed in claim 15, wherein the guide pin has a section as a inverted-T shape having a head portion arranged to said space in the lower portion of the guiding slot, and a diameter of the head portion is formed to be greater than the diameter of the guiding slot for preventing deviation thereof from the guiding slot.

* * * * *